Sept. 23, 1969  K. C. FRACKE  3,468,173
MACHINE TOOL WITH DIFFERENT SPEEDS ON
FORWARD AND RETURN STROKE
Filed May 1, 1967  4 Sheets-Sheet 2

TIME DISPLACEMENT DIAGRAM

VELOCITY RATIO 1:2

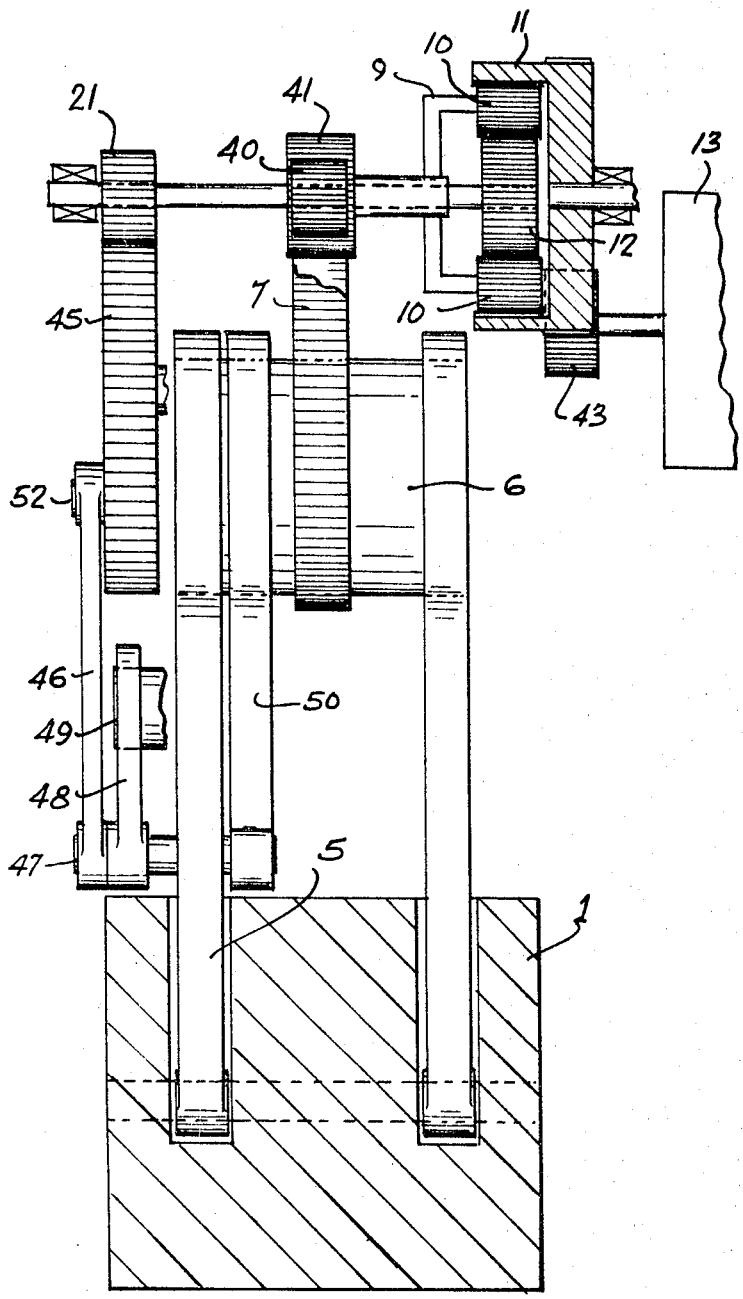

United States Patent Office 3,468,173
Patented Sept. 23, 1969

3,468,173
MACHINE TOOL WITH DIFFERENT SPEEDS ON FORWARD AND RETURN STROKE
Karl Christoph Fracke, Ottawa, Ontario, Canada, assignor to U.S. Industries, Inc., New York, N.Y., a corporation of Delaware
Filed May 1, 1967, Ser. No. 635,069
Int. Cl. F16h 37/12, 19/02
U.S. Cl. 74—52                    10 Claims

ABSTRACT OF THE DISCLOSURE

An apparatus for converting a rotating motion to a linear motion as described in which a wheel performs the rotating motion and is driven by a planetary gear system. A prime mover drives one of the elements of the planetary gear, a second element drives the wheel and the third element is driven in accordance with the linear motion in such a direction to decrease the rate of rotation of the wheel when the linear motion is in one direction and increase the rate of rotation when the linear motion is in the opposite direction.

---

This invention relates to machine tools and has particular reference to a tool which involves a ram head or chuck having a forward working stroke followed by a return stroke to bring it to the start of the next working stroke. This type of action is required in machines such as planers, shapers and presses.

The speed problem is aggravated because there is a limit upon the cutting or forming rate of movement of the tool during the working stroke, but the return stroke should be as rapid as possible. In general it has been difficult to construct a machine in which the ratio of the velocities of the forward and return strokes is greater than 1:1.5. Such designs are also often complicated and expensive to execute.

It is an object of the present invention to meet the difficulties encountered by the prior art, and to provide a machine with a much more rapid return stroke than has hitherto proved possible, and in which forward to return velocity ratios of 1:2 are comfortably achievable. Ratios much higher than this become undesirable, because the massive material being moved during the return stroke starts to limit the speed which can economically be used.

More particularly in accordance with the present invention there is provided in an apparatus in which a rotating motion is converted to a reciprocating linear motion, and in which the linear motion includes a first stroke at a lower velocity than the return stroke.

A wheel for performing the rotating motion;
A planetary gear system comprising a plurality of elements which include a ring gear, planet gears and a sun gear and a carrier for said planet gears;
Means for driving a first one of said elements;
Means connecting a second of said elements to said wheel for driving said wheel; and
Means coupled to the third one of said elements, for rotating said third element in accordance with said linear motion in one direction which results in driving the wheel at a slower speed during the first stroke of the linear motion and for rotating said third element in the opposite direction during the return stroke which results in driving the wheel at a greater speed. Preferably the one gear is the ring gear, the second the planet carrier, and the third the sun gear.

In one embodiment a rack drives the sun gear, and in another the wheel has a crank which is linked to a gear segment which drives the sun gear.

Figure 1:
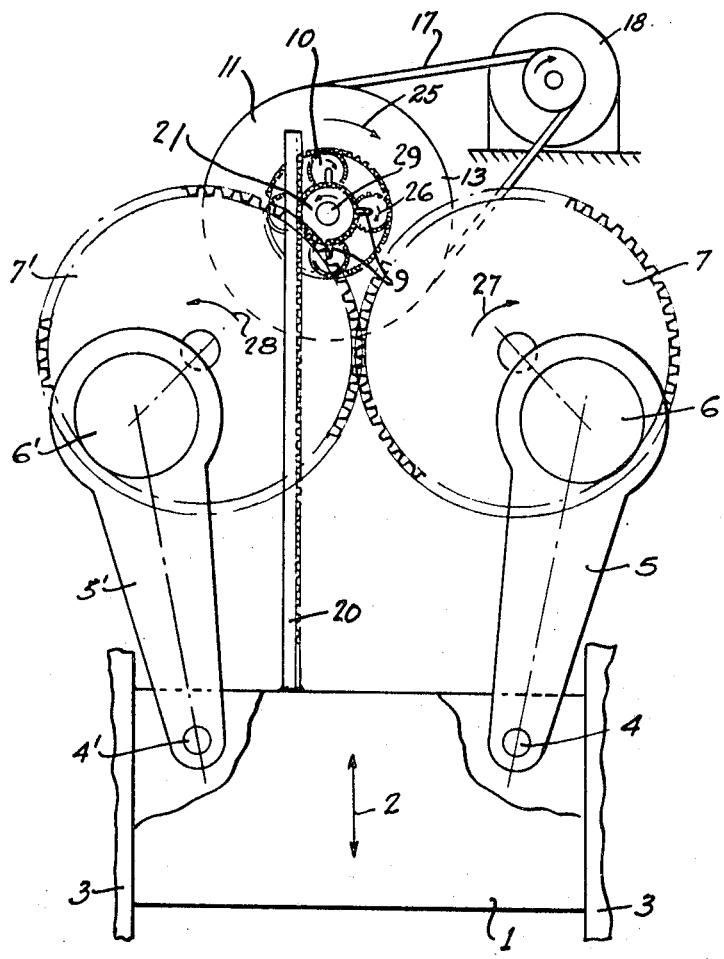
Figure 2:
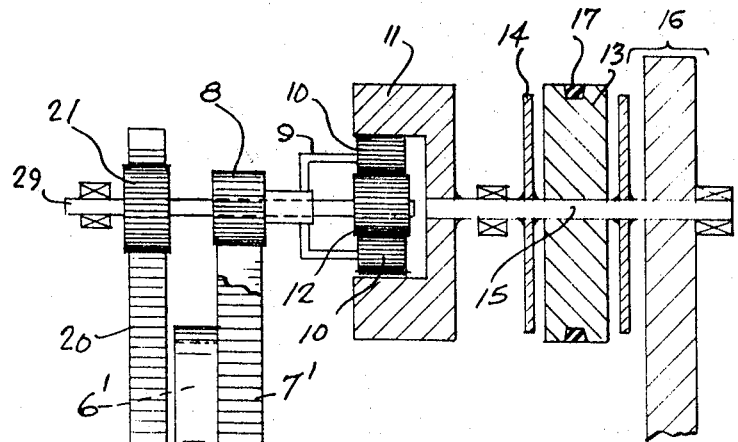
Figure 3:
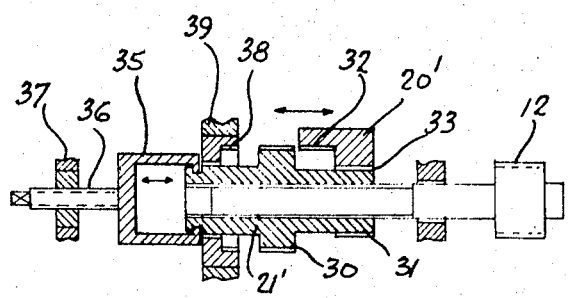
Figure 4:
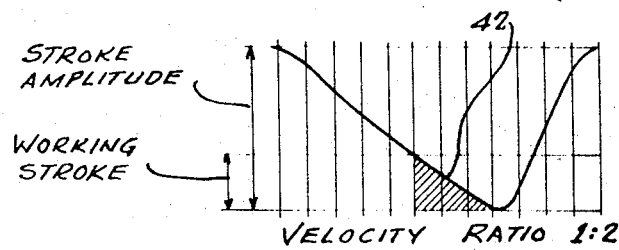
Figure 5:
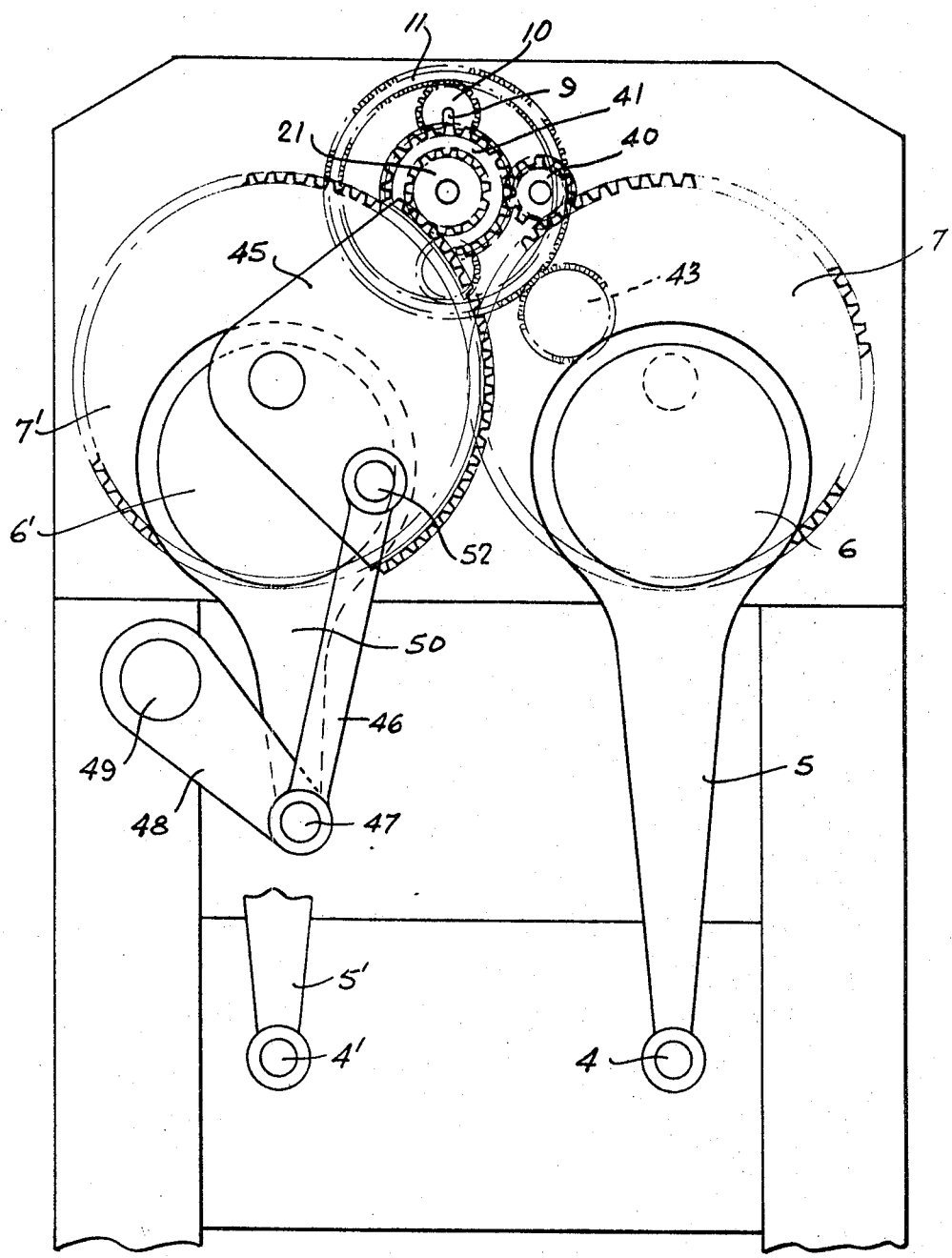

The invention will now be described with reference to the accompanying drawings in which:

FIGURE 1 shows a side view of one form of apparatus embodying the invention,
FIGURE 2 an end view, partly in section, of the driven system according to the invention interposed between a tool head and a driving motor,
FIGURE 3 is a fragmentary longitudinal sectional view of a three speed transmission for use in driving the sun gear of FIGURES 1 and 2, instead of the rack and pinion shown therein,
FIGURE 4 shows a time displacement diagram for the tool head of FIGURES 1 and 2,
FIGURE 5 is a view similar to FIGURE 1 showing a modified form of the driving means for the sun gear which enables a greater control over the forward and return speed performance, and
FIGURE 6 is a view similar to FIGURE 2 but showing the modified sun gear drive means of FIGURE 5.

With reference now to FIGURES 1 and 2, the working head 1 of a machine tool, constrained to move in reciprocal directions shown by the double-headed arrow 2 rests in the guides 3. Bearing pins 4 and 4' on the head 1 engage connecting rods 5 and 5' which in turn embrace cranks 6 and 6' carried by meshing gear wheels 7 and 7'.

The gear 7' is driven by a pinion 8 (FIGURE 2) driven itself by a carrier 9 for planetary gears 10 between ring gear 11 and sun gear 12. The ring gear is connectible to a fly wheel 13 by means of a clutch 14. The shaft 15 driving the ring gear 11 also may engage a brake 16. A belt 17 from a motor 18 drives the fly wheel 13 (the pinion 8 is absent from FIGURE 1 to improve the clarity).

Finally the working head 1 is connected by a rack 20 to drive a pinion 21 itself directly coupled to the sun gear 12.

If we now assume that the down stroke of head 1 is to be the forward working stroke, and if we assume that the fly wheel 13 and ring gear 11 turn in the direction of the arrow 25 (and if we also assume for the moment that sun wheel 12 is fixed and the rack 20 disconnected from the pinion 21) the planets 10 will turn clockwise in the direction of arrow 26. If the sun gear 12 is fixed, the clockwise rotation of the planet gears 10 will cause them to revolve bodily around the shaft 29 thereby causing the carrier 9 to rotate in a clockwise direction as well as the pinion 8. This clockwise rotation of pinion 8 will thereupon cause the wheels 7 and 7' to rotate in the direction of arrows 27 and 28 respectively. Let us now assume that the rack 20 is recoupled with the pinion 21, which, during the forward stroke, will cause the sun wheel 12 to turn in a counterclockwise direction on shaft 29 as indicated by the arrow in FIGURE 1. With the sun gear rotating in a counterclockwise direction and the planet gears rotating in a clockwise direction, the rotary speed of the carrier 9 by reason of the planet gears revolving about shaft 29 will be diminished. Clearly if the speed of the perimeter of sun gear 12 were made equal to that of the speed of the internal periphery of ring gear 11 there would be no movement of the planet carrier 9 so that motion of the wheels 7 and 7' would cease. Similarly when the head 1 is on the return stroke, the upwards movement of rack 20 will cause the sun gear 12 to rotate in the opposite or clockwise direction on shaft 29 which will increase the speed at which the planet gears 10 and carrier 9 will revolve and thereby increase the speed of rotation of pinion 8 and accelerate the rotation velocity of wheels 7 and 7'.

To achieve a variation in the forward to reverse speed ratio the sun gear 12 can be driven by the apparatus shown in FIGURE 3 instead of rack 20 and pinion 21 of FIGURE 2. The gear 12 is coupled by means of a splined shaft (not detailed) to the pinion 21' which carries gear teeth 30 and 31. The rack 20' carries teeth 32 and 33 and pinion 21' is shiftable from the position shown either to the right or left thereof. In the position shown in FIG- URE 3 the rack teeth 33 engage the pinion teeth 31 so that because of the smaller diameter of this portion of the pinion, the velocity ratio from rack to pinion is greater than in the second position of the rack wherein pinion 21' is shifted to the right so that the teeth 32 engage pinion teeth 30 on the portion of the pinion of larger diameter. The apparatus also provides for the leftwards movement of pinion 21' by means of the jaw 35 carrying threaded shaft 36 which cooperates with a fixed nut 37. As the pinion is moved in the leftwards direction the gear teeth 30 engage the internally formed teeth 38 on the fixed ring gear 39. In this position the rack is decoupled from the pinion and the forward and reverse ratio for the head is 1:1 because the sun gear is fixer and locked against rotation.

Reference to FIGURE 4 shows the displacement diagram that is obtained for the head with a forward to reverse speed ratio of 1:2 and in which 42 is the working part of the forward stroke.

A preferred embodiment of the invention may be constructed by use of the apparatus in FIGURES 5 and 6 in which similar parts to those occurring in FIGURES 1 and 2 bear similar reference numerals.

In this case the connecting rods 5 and 5' are driven from the two contra-rotating wheels 7 and 7' by large crankshafts 6 and 6' which are shown as eccentrics. The gear 7 is driven by a pinion 40 which in turn is driven by gear 41 coupled to the planet carrier 9 for the planet gears 10. In this instance the ring gear 11 is driven by a pinion 43 which can be coupled to the fly wheel 13. The belt coupling of FIGURE 1 may be used instead if desired. In the view of FIGURE 5 the sun wheel 12 is hidden by the drive wheel 41, but can be seen in FIGURE 6. The drive for this sun wheel is achieved as before by means of a pinion 21. The pinion 21 is however now driven by a segment follower gear 45 to which is coupled a link rod 46. The lower end bearing 47 of the connecting rod 46 rides on an idler arm 48 pivoted on the machine bed at 49. The bearing 47 also engages an auxiliary connecting rod 50 carried on the eccentric 6'.

It can be seen now that although the rack 20 is no longer present, a similar type of drive is available for the pinion 21 connected to the sun wheel 12 by virtue of the movement imparted to the gear segment 45. Thus, as the working head 1 moves up, the pinion 21 is rotated in a direction which is the same as that of the ring gear 11 thereby increasing the speed of pinion 40 and the rate of rotation of wheels 7 and 7'. During the working stroke the follower gear 45 moves in the direction opposite to that of rotation of the ring gear 11 thereby reducing the stroke velocity.

The particular arrangement in which the arm 48 provides a greater radius of arc of movement for the bearing 47 than for the bearing 52, connected to the segment 45, and the choice of the velocity ratio between the sun gear 12, planetary whels 10, and ring gear 11 determine the velocity ratio between working and return stroke for the head 1. The vertical position of the pivot 49 also affects the velocity ratio embodiment of FIGURES 5 and 6. Preferably the idler arm 48 is mounted to rotate in the same direction as the gear segment follower 45.

By this method a very much greater choice of ratio of working stroke to return stroke can be obtained, and as an example using this construction a 600 ton press with a working stroke of 30 inches can make 24 strokes per minute with a working speed of 83 feet per minute at a distance of 6 inches from the bottom of its stroke and in which wheels 7 and 7' are 42° displaced from the bottom dead centre position.

It will be understood that although a mechanism has been described in which the ring gear is driven by the prime mover and the planet carrier drives the wheel providing the reciprocation motion, with the control motion applied to the sun gear, those skilled in the art will appreciate that it would be possible to drive the sun gear and apply the controlling motion to the ring gear. Equally well any one integer of the ring, carrier, and sun gears may be driven, with the wheel drive taken from, and controlling motion applied to, either of the remaining two integers of the planetary gear.

The gear system of FIGURE 3 may be combined with the apparatus of FIGURES 5 and 6, by modifying the sector 45 in a similar manner to the rack 20 of FIGURES 1 and 2, so that the new sector follower drives pinion 21'.

I claim:

1. Apparatus for reciprocating a working head in a linear motion wherein the working stroke thereof is at a slower rate of speed than the return stroke thereof, comprising,
    (a) primary drive means,
    (b) rotary drive means coupled to the working head to impart a reciprocating movement thereto,
    (c) a planetary gear system interposed between said primary drive means and said rotary drive means, said system having a plurality of interconnected elements including
        (1) a ring gear,
        (2) a sun gear, and
        (3) a carrier and planetary gears assembly,
    (d) means connecting said primary drive means to a first one of said elements,
    (e) means connecting said rotary drive means with a second one of said elements whereby rotation of said first one of said elements will cause rotation of said second one of said elements and said rotary drive means, thereby to reciprocate the working head, and
    (f) means operable by reciprocation of the working head and connected to a third one of said elements to rotate said third one of said elements in one direction during the working stroke of the head and in the other direction during the return stroke of the working head,
    (g) rotation of said third one of said elements in said one direction being adapted to cause rotation of said second one of said elements and said rotary drive means connected thereto at one speed, and rotation of said third one of said elements in said other direction being adapted to cause rotation of said second one of said elements and said rotary drive means connected thereto at a speed greater than said one speed.

2. Apparatus as defined in claim 1, wherein the first one of said elements is the ring gear, the second one of said elements is the carrier and planetary gears assembly, and the third one of said elements is the sun gear.

3. Apparatus as defined in claim 1, wherein said rotary drive means is a gear wheel, and the element of said planetary gear system to which it is connected is the carrier and planetary gears assembly.

4. Apparatus as defined in claim 1, wherein the means operable by reciprocation of the working head and connected to said third one of said elements includes a rack on the working head meshing with a pinion connected to said third one of said elements.

5. Apparatus as defined in claim 1, wherein the means operable by reciprocation of the working head and connected to said third one of said elements includes a gear segment meshing with a pinion connected to said third one of said elements, and means for reciprocating said gear segment with the reciprocation of the working head.

6. Apparatus as defined in claim 2, wherein the means operable by reciprocation of the working head includes a rack on the working head in mesh with a pinion connected with said sun gear.

7. Apparatus as defined in claim 2, wherein the means operable by reciprocation of the working head and connected to said sun gear includes a gear segment meshing with a pinion connected to said sun gear, and means for reciprocating said gear segment with the reciprocation of the working head.

8. Apparatus as defined in claim 5, wherein said last named means includes a crank on said rotary drive means, a connecting rod on said crank, an idler arm mounted for rotation at one end thereof and supporting said connecting rod at the other end thereof, and means connecting said other end of said arm to said gear segment.

9. Apparatus as defined in claim 8, said last named means including a link connected between said gear segment and said connecting rod, a first pin on said gear segment for receiving one end of said link, a second pin on said idler arm for receiving the other end of said link, the radius of arc of travel of said first pin being smaller than that of the second pin.

10. Apparatus for reciprocating a working head in a linear motion, comprising
 (a) primary drive means,
 (b) rotary drive means coupled to the working head to impart a reciprocating motion thereto,
 (c) a planetary gear system interposed between said primary drive means and said rotary drive means, said system including
  (1) a ring gear,
  (2) a sun gear,
  (3) planetary gears, and
  (4) a carrier for said planetary gears,
 (d) means connecting said primary drive means to said ring gear,
 (e) means connecting said rotary drive means with said carrier and planetary gears, whereby rotation of said ring gear will rotate said planetary gears and said carrier, thereby to reciprocate the working head,
 (f) means operable by reciprocation of the working head and adapted to be coupled to said sun gear to rotate said sun gear in one direction during the working stroke of the head and in the other direction during the return stroke of the head, and
 (g) shiftable means adapted to couple said last named means to said sun gear in one position thereof, and to uncouple said sun gear therefrom in another position thereof.

References Cited
UNITED STATES PATENTS

| | | | |
|---|---|---|---|
| 1,018,284 | 2/1912 | White | 100—284 |
| 1,387,747 | 8/1921 | Whitt | 100—288 |
| 1,421,571 | 7/1922 | Rodger | 74—29 |
| 2,105,473 | 1/1938 | Dean | 74—388 |

FRED C. MATTERN, JR., Primary Examiner

W. S. RATLIFF, JR., Assistant Examiner

U.S. Cl. X.R.

74—29, 388; 100—288